H. C. MILLER.
MOTOR FOR TALKING MACHINES.
APPLICATION FILED SEPT. 28, 1906.
989,629.
Patented Apr. 18, 1911.
2 SHEETS—SHEET 1.
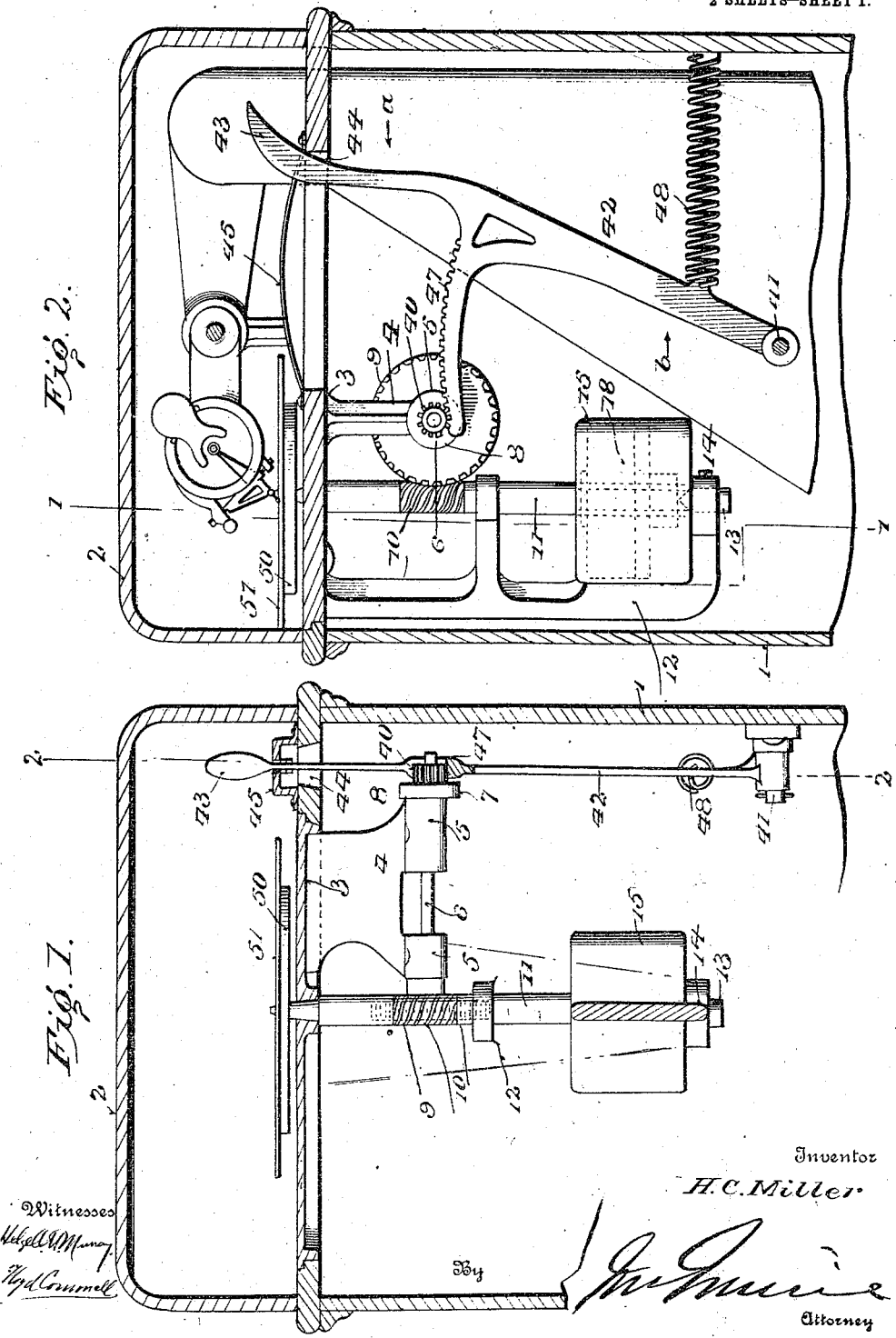
Inventor
H. C. Miller

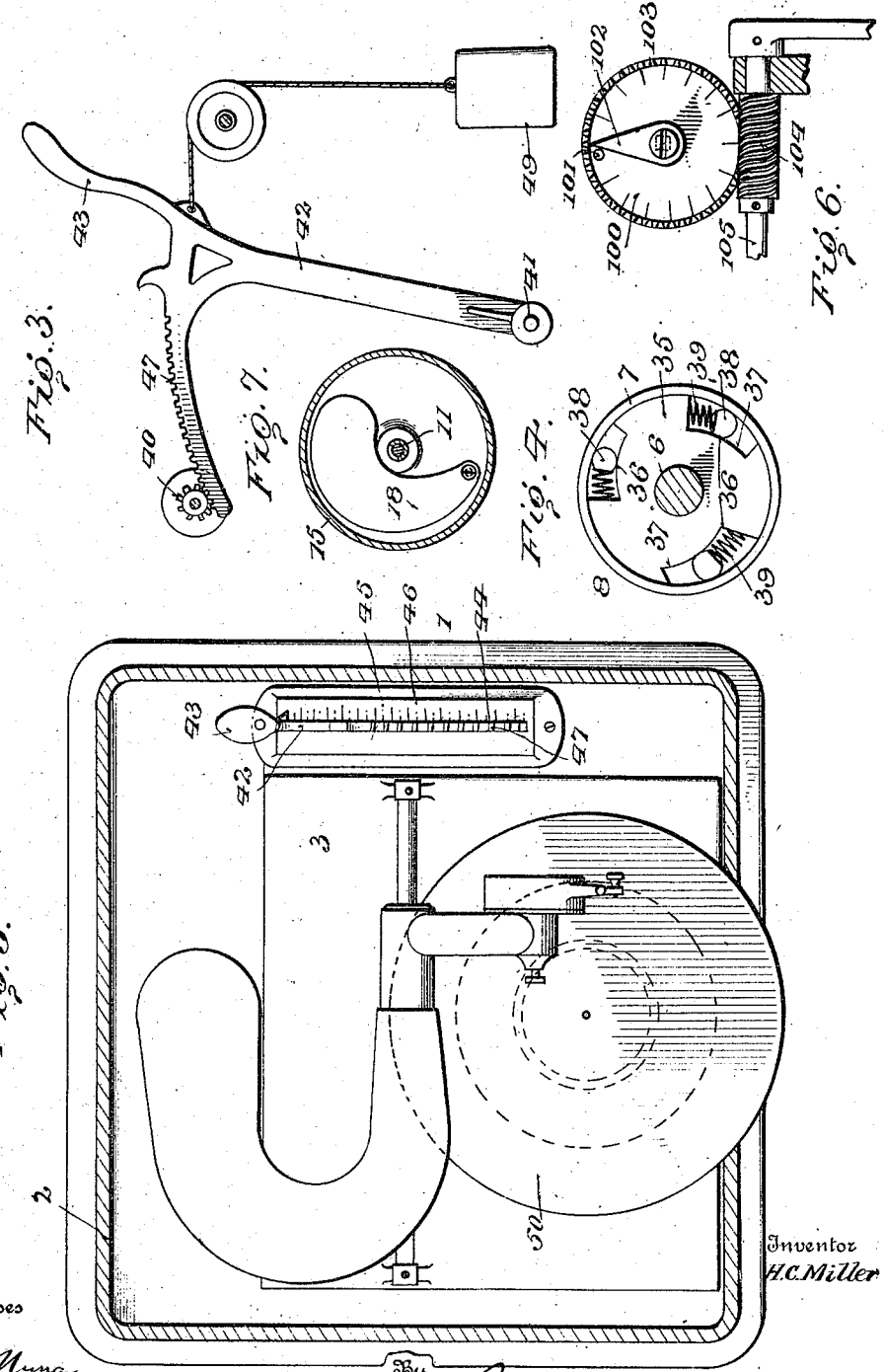

UNITED STATES PATENT OFFICE.

HENRY C. MILLER, OF WATERFORD, NEW YORK.

MOTOR FOR TALKING-MACHINES.

989,629.  Specification of Letters Patent.  Patented Apr. 18, 1911.

Application filed September 28, 1906. Serial No. 336,616.

*To all whom it may concern:*

Be it known that I, HENRY C. MILLER, a citizen of the United States, residing at Waterford, in the county of Saratoga and State of New York, have invented certain new and useful Improvements in Motors for Talking-Machines, of which the following is a specification.

This invention relates to motors designed primarily for talking machines, and more particularly to the various details of construction thereof.

The prime object of the invention is to provide a motor mechanism provided with specific winding means, and means for reducing to a minimum the parts, whereby the noise incident to the running of the mechanism is greatly reduced.

With motors now used in connection with talking machines, the mechanism is arranged so that several selections may be reproduced with one winding, which causes considerable annoyance, inasmuch as the attendant must be in proximity to the machine to stop it, otherwise the stylus running over the record beyond the groove produces a very unpleasant sound. Then again, the first selection is reproduced in the proper time, but the subsequent selection will be slower and not up to the standard. This is due to the fact that the motor as it runs down necessarily becomes weaker and the record is therefore caused to travel slower. But as this effect is so well known in the art it is not deemed necessary to further amplify it more than to state broadly that it is one of the objects of my present invention to cure the defect. To meet this weakness in structure, I provide means, such for instance, as a lever, having connected with it a motor, that by movement of said lever a determinate distance, prearranged in accord with a particular record, and then released, when the end of the selection on the record is reached, the machine will be automatically stopped and the attendant as well as the audience will enjoy the reproduction.

Other objects and advantages will be hereinafter referred to and particularly pointed out in the claims.

In the drawings:—Figure 1, is a section approximately on the line 1—1, Fig. 2. Fig. 2, is a section approximately on the line 2—2, Fig. 1. Fig. 3, is a similar view of a slightly different form of motor. Fig. 4, is a detail view of a friction clutch used in connection with my invention. Fig. 5, is a detail view. Fig. 6, is a detail view of a slightly different form of indicator. Fig. 7 is a detail plan view partially in section, of the governor.

The numeral 1, indicates a casing, 2, the top of the same, and 3, a frame supported by the top. A bracket 4, depending from the frame 3, has formed in its lower portion bearings 5, in which is mounted a power shaft 6. Fast on one end of said shaft is a member 7, of a friction clutch 8, and on the opposite end is a worm gear 9. Worm gear 9, meshes with a worm 10, on a counter shaft 11, mounted in bearings formed on a bracket 12, secured to frame 3. The counter shaft is further supported at its lower end by a conical bearing 13, seated in the bracket 12, and fixed in position by a set screw 14. The lower end of bracket 12, is formed into an annular portion or track 15, to coöperate with a governor 18.

The clutch 8, may be of any form, but the construction shown in the drawing consists of a cup shaped member and revolving within this cup shaped member, is a disk 35, having a series of notches 36, with inclined faces as indicated at 37, between each of which and the inner portion of the flange of the member 7, operate balls or rollers 38, having tension springs 39, to force them into operative position. On the outer face of the disk 35, is fastened a pinion 40.

Pivoted on the inside of the case 1, at 41, is a lever 42, formed with a handle 43, which extends through an opening 44, in the top 2, adjacent which is a slotted plate 45 provided with a series of indicating points 46. The lever 42, is provided with a rack 47, to engage with pinion 40, as clearly shown in Figs. 2, and 3, and connected with the opposite side of said lever, is a motor spring 48. This motor, as shown in Fig. 2, may be in the form of a spring, or as shown in Fig. 3, may be in the form of a weight 49. Obviously a coil spring will not bind like a flat spring, as in motors now used for talking machine purposes.

On the upper end of the counter shaft 11, which extends through the frame 3, is mounted a turntable 50, for supporting a record 51.

As hereinbefore indicated, I propose to arrange my improved mechanism so that when the lever 42, is operated it will store power sufficient to revolve the record according to the length of the selection thereon. That is to say, each record will have applied to it a character, corresponding to a similar character on the plate 45, and when a particular record is being used, the lever will be moved to the character adjacent plate 45, and the motor will be set so as to play but one piece. When the spring returns lever 42, to normal position said lever will contact with the plate 45, at the end of the slot 44, hence the mechanism will be stopped. In this manner I avoid the usual grating of the stylus over the record and at the same time am enabled to start a selection and leave the machine that the operator as well as the audience may enjoy the benefits of the selection. This avoids the necessity of the operator being in proximity with the machine to turn off the motor after the selection has been reproduced.

When the lever 42, is moved in the direction of the arrow $a$, Fig. 2, the balls or rollers 38, are caused to be moved into the widest portion of the notches 36, hence motion is not imparted to the shaft 6, but immediately upon release of said lever, the motor spring or weight, as the case may be, acting on lever 42, in the direction of arrow $b$, Fig. 2, imparts motion to said shaft 6. The motion to the shaft 6, is transmitted through worm gear 9, to the worm 10, hence to the counter shaft 11, and then to the turntable.

In Fig. 6, I have shown a different form of indicator, which consists of a disk 100, with indicating characters thereon, and a stop 101. A pointer 102, on the face of the disk coöperates with it to determine the time the motor will be in operation. Revolving with the disk, or formed with it if desired, are teeth 103, which mesh with a worm 104, on a shaft 105, which in turn is connected with the motor (not shown in this figure.)

What I claim is:

1. A motor for a talking machine comprising a counter-shaft, a power shaft, means for operating the counter-shaft from the power shaft, a lever arranged for manual operation in one direction, means for moving the lever in the opposite direction, a connection between the lever and power shaft to operate the latter in the movement of the lever under the influence of its operating means, means for limiting movement of the lever in one direction, and means for gaging the normal movement of the lever to regulate the extent of its movement under its operating means.

2. A motor for a talking machine comprising a counter-shaft, a power shaft, means for operating the counter-shaft from the power shaft, a lever arranged for manual operation in one direction, means for moving the lever in the opposite direction, a connection between the lever and power shaft to operate the latter in the movement of the lever under the influence of its operating means, means for limiting movement of the lever in one direction, and a graduated dial coöperating with the lever to gage its manual movement.

3. A motor for a talking machine comprising a counter shaft, a worm on said counter shaft, a power shaft, a gear on the power shaft, said gear meshing with the worm, a lever arranged for manual operation in one direction, means for moving the lever in the opposite direction, a gear and clutch connection between the lever and power shaft to operate the latter in the movement of the lever under the influence of its operating means when the lever is manually moved and also means to connect the gear connection with said power shaft when the lever is moved in the opposite direction, means for limiting movement of the lever under its operating means, and a governor operating in connection with the counter shaft for regulating movement of the latter.

4. A motor for a talking machine comprising a counter shaft, adjustable means for centrally supporting said counter shaft, a bearing for the counter shaft above said central adjusting means, a power shaft, gearing between the power shaft and the counter shaft, a gear and clutch on the power shaft, a lever having teeth engaging the gear on the power shaft and arranged for manual operation in one direction, means for moving the lever in the opposite direction, and means for limiting the movement of the lever.

5. A motor for a talking machine comprising a power shaft and gearing, a lever arranged for manual operation in one direction, means for moving the lever in the opposite direction, a connection between the lever and power shaft to operate the latter in the movement of the lever under the influence of its operating means, and means for gaging the movement of the lever to regulate the extent of its movement under its operating means.

In testimony whereof I have signed my name to this specification in the presence of two subscribing witnesses.

HENRY C. MILLER.

Witnesses:
A. D. ZEH,
F. F. FOLLET.